(12) United States Patent
Mizusawa et al.

(10) Patent No.: US 6,765,607 B2
(45) Date of Patent: Jul. 20, 2004

(54) DRIVING AIDING SYSTEM

(75) Inventors: Kazufumi Mizusawa, Kawasaki (JP); Shusaku Okamoto, Hirakata (JP); Takashi Yoshida, Ikoma (JP); Ryosuke Iida, Yokohama (JP); Yuichi Hirama, Yokohama (JP); Michio Miwa, Urayasu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 153 days.

(21) Appl. No.: 10/115,845

(22) Filed: Apr. 3, 2002

(65) Prior Publication Data

US 2002/0145662 A1 Oct. 10, 2002

(30) Foreign Application Priority Data

Apr. 9, 2001 (JP) .................................. P. 2001-110258

(51) Int. Cl.⁷ ................................................. B60Q 1/00
(52) U.S. Cl. ........................................ 348/118; 348/119
(58) Field of Search .............................. 348/118, 119, 348/143, 144, 147, 148, 150, 151, 735, 207.99, 233.01, 239; 340/431, 687, 305, 438, 686.1; 280/477; 33/286; 404/94; 345/156; 700/115, 116, 224, 225; H04N 7/18

(56) References Cited

U.S. PATENT DOCUMENTS

| | | | | |
|---|---|---|---|---|
| 4,173,353 A | * | 11/1979 | Steele | 280/477 |
| 5,097,250 A | * | 3/1992 | Hernandez | 340/438 |
| 5,615,023 A | | 3/1997 | Yang | |
| 5,650,764 A | | 7/1997 | McCullough | |
| 5,861,814 A | * | 1/1999 | Clayton | 340/687 |
| 5,947,637 A | * | 9/1999 | Neuling | 404/94 |
| 5,951,035 A | * | 9/1999 | Phillips et al. | 280/477 |
| 6,176,505 B1 | * | 1/2001 | Capik et al. | 280/477 |
| 6,178,650 B1 | * | 1/2001 | Thibodeaux | 33/286 |
| 6,222,457 B1 | * | 4/2001 | Mills et al. | 340/686.1 |
| 6,259,357 B1 | * | 7/2001 | Heider | 340/431 |
| 6,382,653 B1 | * | 5/2002 | Bass | 280/477 |
| 6,480,104 B1 | * | 11/2002 | Wall et al. | 340/431 |
| 2002/0018047 A1 | * | 2/2002 | Okada et al. | 345/156 |
| 2002/0145663 A1 | * | 10/2002 | Mizusawa et al. | 348/118 |
| 2002/0149673 A1 | * | 10/2002 | Hirama et al. | 348/118 |
| 2002/0154005 A1 | * | 10/2002 | Wall et al. | 340/431 |
| 2003/0122930 A1 | * | 7/2003 | Schofield et al. | 348/148 |

FOREIGN PATENT DOCUMENTS

| JP | 11-334470 | 12/1999 |
|---|---|---|
| WO | WO 96/38319 | 12/1996 |

* cited by examiner

*Primary Examiner*—Tung T Vo
(74) *Attorney, Agent, or Firm*—Pearne & Gordon LLP

(57) ABSTRACT

In a driving aiding system for displaying a picked-up image of a rear-view camera equipped onto a rear portion of a vehicle on a screen of a displaying means arranged at a position which can be viewed from a driver's seat when the vehicle is to be backed, a locus estimated line 10 of a hitch which is equipped onto a rear portion of the vehicle is superposed on the picked-up image of the rear-view camera to display when a predetermined instruction input is received.

16 Claims, 6 Drawing Sheets

DRIVING AIDING SYSTEM

BACKGROUND OF THE INVENTION

1. Field of the Invention

The present invention relates to a driving aiding system for aiding the drive by displaying an image picked up by a vehicle-equipped camera on a displaying means provided to a position that is visible from a driver's seat and, more particularly, a driving aiding system for aiding the backward driving of the vehicle in the hitch coupling operation by backing the vehicle that is equipped with a hitch, which is coupled onto a trailed vehicle, at a rear portion of the vehicle.

2. Description of the Related Art

The vehicles onto which a driving aiding system, that is capable of check the safety by providing a rear-view camera to the rear portion of the vehicle and then displaying the image picked up by the rear-view camera on the monitor screen provided near the driver's seat when the vehicle is to be backed, is equipped begin to spread. For the purpose of preventing the contact with the rear obstacle when the vehicle is to be backed at the time of parking, the wide-angle camera is employed as this rear-view camera such that the wide range can be covered in one screen.

In order to couple the trailed vehicle such as the trailer, the camping car, etc. to the rear portion, there are vehicles in which the hitch is provided to the rear portion. When the trailer, etc. is coupled to this hitch, the vehicle is to be backed such that the hitch of the vehicle coincides with the trailer side coupler. But it is a very troublesome to back the vehicle with good precision such that the hitch that is fitted to a dead angle position, which is not viewed from the driver, coincides with the trailer side coupler.

If the rear-view camera is equipped on the trailing vehicle side, the driver can back the vehicle while checking the rear side by the picked-up image of the rear-view camera. However, as described above, the picked-up image of the rear-view camera provides the largely distorted screen because the rear-view camera is the wide-angle camera, and also the fitted positions of the hitch and the destination coupler are present at positions floated from the ground respectively. For this reason, it is a considerably skilled operation to cause the hitch and the destination coupler to coincide with each other at one point in a three-dimensional space while looking at the picked-up image of the rear-view camera.

SUMMARY OF THE INVENTION

It is an object of the present invention to provide a driving aiding system that makes it possible for the driver to back the vehicle with good precision while looking at a picked-up image of a rear-view camera such that the hitch provided to the rear portion of the vehicle coincides with the destination coupler.

The above object can be achieved by providing a driving aiding system for displaying a picked-up image of a rear-view camera equipped onto a rear portion of a vehicle on a screen of a displaying means arranged at a position, which can be viewed from a driver's seat, when the vehicle is to be backed, which comprises a locus superposing means for superposing a locus estimated line of a hitch, which is equipped onto a rear portion of the vehicle, on the picked-up image of the rear-view camera to display when a predetermined instruction input is received.

According to this configuration, by fitting the locus estimated line of the hitch to the coupler of the trailed vehicle, the steering angle can be sensed when the vehicle is backed to mate the hitch with the destination coupler. Therefore, the driving operation can be facilitated and also the hitch can be caused to coincide with the destination coupler with high precision.

Also, the above object can be achieved by providing a driving aiding system for displaying a processed image obtained by processing a picked-up image of a rear-view camera equipped onto a rear portion of a vehicle on a screen of a displaying means arranged at a position, which can be viewed from a driver's seat, when the vehicle is to be backed, which comprises a locus superposing means for superposing a processed locus estimated line of a hitch, that is equipped onto a rear portion of the vehicle, on the processed image to display when a predetermined instruction input is received.

According to this configuration, even if the image to be displayed on the screen is processed to the easily viewed image, the steering angle that causes the hitch to coincide with the destination coupler can be known with good precision. Thus, the driver aiding effect can be enhanced.

Preferably, in the above, the locus superposing means has a means for superposing a line, that is obtained by projecting the locus estimated line onto a road surface, simultaneously on the screen to display when the locus estimated line of the hitch is superposed on the screen to display. Also, the locus superposing means has a means for superposing vertical lines indicating a height of a coupler as a coupling destination of the hitch at a proper interval onto the locus estimated line and a road-surface projected locus estimated line to display. Further, the locus superposing means has a means for superposing a curved line indicating a height of a coupler as a coupling destination of the hitch along the locus estimated line on the screen to display.

According to this configuration, the locus estimated line of the hitch is in the floating state on the road surface with respect to the locus estimated line, and the height of the destination coupler can be viewed easily from the screen. Therefore, the correlation between both locus estimated lines can be grasped in three dimensions, and also the positional relationship between the hitch and the destination coupler, both have a different height respectively, can be grasped precisely. Thus, the driver aiding effect can be enhanced further.

Further preferably, in the above, the locus superposing means has a means for changing the locus estimated line in response to change in a steering angle of the vehicle. Also, the locus superposing means has a means for changing the locus estimated line in response to change in a height.

According to this configuration, even if the steering angle and the height of the hitch are changed, the proper hitch locus can always be provided to the driver. Thus, the steering operation can be carried out to mate the hitch with the destination coupler with high precision.

The above object can be achieved by providing a driving aiding system for displaying a picked-up image of a rear-view camera equipped onto a rear portion of a vehicle on a screen of a displaying means arranged at a position, that can be viewed from a driver's seat, when the vehicle is to be backed, which comprises a locus superposing means for superposing a locus estimated line of a hitch, that is equipped onto a rear portion of the vehicle, at a maximum steering angle on the picked-up image of the rear-view camera to display.

According to this configuration, in the vehicle that does not sense the steering angle, if the steering is turned at maximum at a point of time when the image of the destination coupler coincides with the hitch locus estimated line at the maximum steering angle, the hitch can be caused to coincide with the destination coupler.

The above object can be achieved by providing a driving aiding system for displaying a processed image obtained by processing a picked-up image of a rear-view camera equipped onto a rear portion of a vehicle on a screen of a displaying means arranged at a position, that can be viewed from a driver's seat, when the vehicle is to be backed, which comprises a locus superposing means for superposing a processed locus estimated line of a hitch, that is equipped onto a rear portion of the vehicle, at a maximum steering angle on the processed image to display when a predetermined instruction input is received.

By employing this configuration, even if the image to be displayed on the screen is processed to the easily viewed image, it is made possible to operate so that the hitch coincides with the destination coupler. Thus, the driver aiding effect can be enhanced.

Preferably, in the above, the image processing means has a means for superposing the locus estimated line of the hitch at a steering angle of 0 degree on the screen to display. According to this configuration, it is possible to check the direction on the screen when the vehicle is backed straightly at the steering angle of 0 degree, and thus the driving aiding effect can be enhanced.

DESCRIPTION OF THE PREFERRED EMBODIMENTS

An embodiment of the present invention will be explained with reference to the drawings hereinafter.

Figure 1:
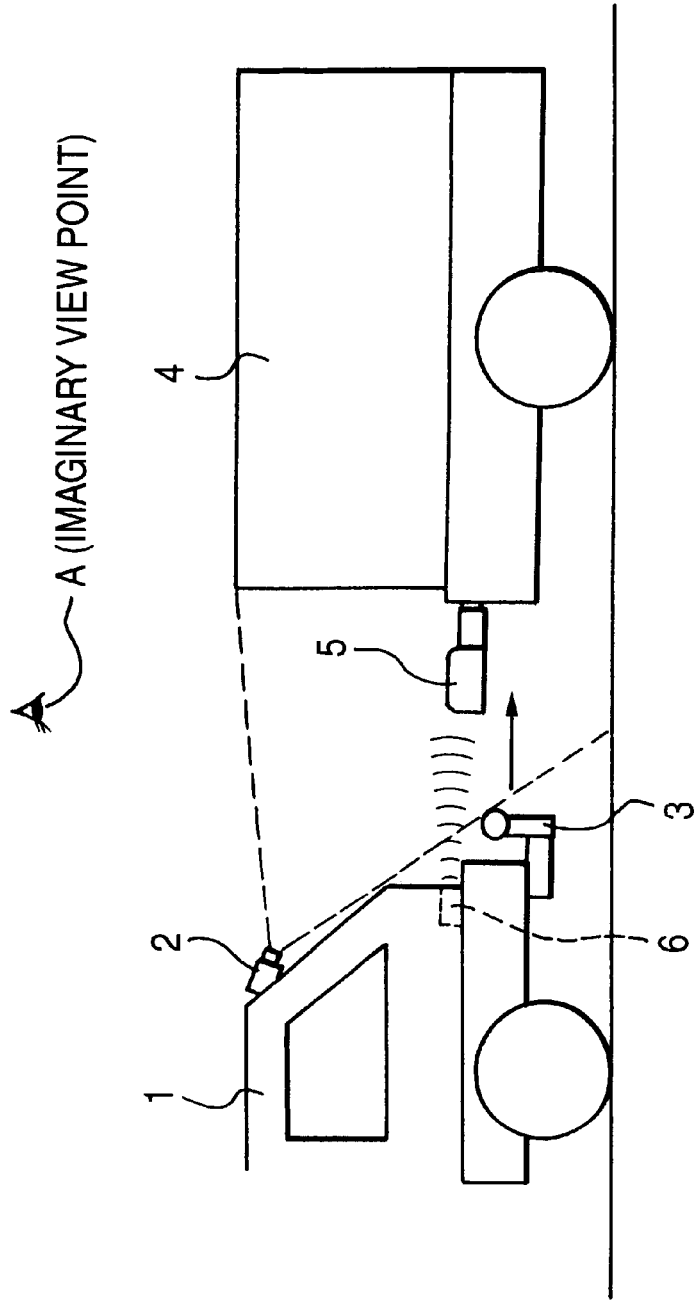
FIG. 1 is a view showing a relationship between a vehicle with a hitch equipped with a rear-view camera and a trailed vehicle.

FIG. 1 is a view showing a relationship between a vehicle that is equipped with a rear-view camera and a hitch and a trailed vehicle such as a trailer, etc. A rear-view camera 2 is equipped onto the rear portion of a vehicle 1. One rear-view camera 2 may be provided to the rear portion of a vehicle 1, or two rear-view cameras 2 may be provided to display a synthesized image on a screen of a driver's seat from two images picked-up by two cameras, which pick up the images of left and right rear portions of the vehicle respectively. A hitch 3 is fixed to the center rear portion of the vehicle 1 such that, when the vehicle 1 is backed, this hitch 3 is coupled to a coupler 5 on the trailer 4 side. Also, an ultrasonic range sensor 6 is fitted to the rear portion of the vehicle 1 to measure a distance to a rear obstacle.

If the operation for coupling the hitch 3 to the coupler 5 is carried out, the vehicle 1 must be backed such that a head portion of the hitch 3 coincides with the coupler 5. Therefore, the backward of the vehicle 1 is picked up by the rear-view camera 2, and then the picked-up image is displayed on a liquid crystal screen for a car navigation system in front of the driver's seat, for example. At this time, if at least a part of the hitch 3 is caught by the rear-view camera 2, the image of the hitch 3 and the image of the coupler 5 are displayed in one screen, and therefore the vehicle 1 can be backed such that the hitch 3 coincides with the coupler 5. If the hitch does not enter into the imaging range of the rear-view camera 2, an illustration image indicating the presence location of the hitch may be displayed superposedly in the picked-up screen of the rear-view camera to deal with this situation.

However, because the rear-view camera 2 is a wide-angle camera, the picked-up image is largely distorted rather than the actual image, so that it is difficult to get the sense of distance from such image. The hitch 3 and the coupler 5 are fixed at positions that are floated from the ground, and also the rear-view camera 2 picks up images of the hitch 3 and the coupler 5 obliquely from the upper direction. Therefore, it is difficult for the driver to view the relative relationship between respective heights on the screen, and thus it requires a skill to back the vehicle 1 such that the hitch 3 coincides with the coupler 5.

Figure 2:
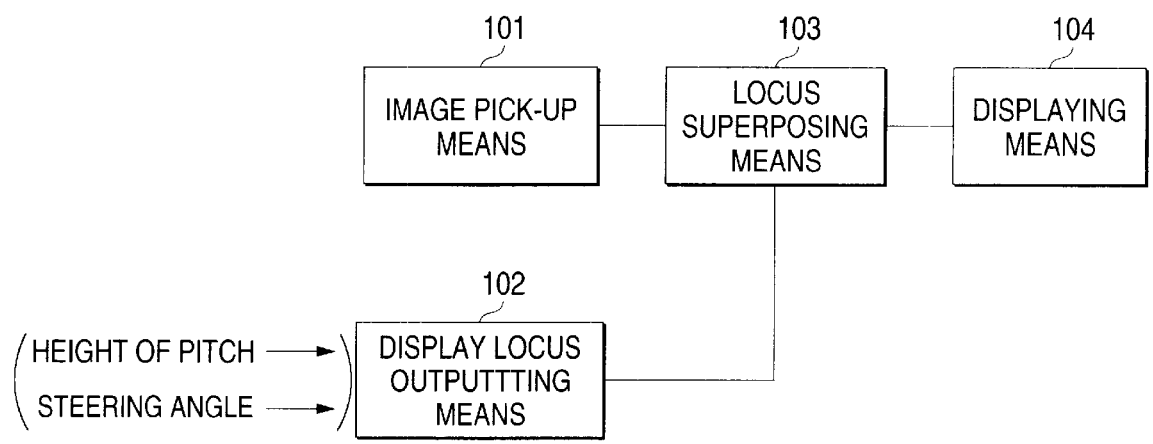
FIG. 2 is a view showing a configuration of a driving aiding system according to an embodiment of the present invention.

FIG. 2 is a block diagram showing a configuration of a driving aiding system according to a first embodiment of the present invention. The driving aiding system according to the present embodiment comprises an image picking-up means 101, a display locus outputting means 102, a locus superposing means 103 for superposing a hitch locus estimated line, which is output from the display locus outputting means 102, on the picked-up image of the image picking-up means 101 and a displaying means 104 for displaying the picked-up image on which the hitch locus estimation is superposed. The image picking-up means 101 corresponds to the rear-view camera 2 shown in FIG. 1, and picks up the image of the surroundings of the vehicle 1 on the rear side and the image of the hitch 3.

A height information of the hitch, a sensed value of a steering angle sensor, and information (camera parameters) of the image picking-up means 101 such as a vehicle loading position, etc. are input into the display locus outputting means 102. The display locus outputting means 102 outputs data (line drawing) indicating the hitch locus estimation in the picked-up image of the image pick-up means 101, based on these information. Since the image picking-up means 101 and the hitch 3 are fixed to the vehicle, heights of the image picking-up means 101 and the hitch 3 have a fixed value respectively. However, the heights of the hitch, etc. become low if the vehicle laden weight is heavy. For this reason, if the hitch height and the camera position must be detected with high precision, a height sensing means can be equipped onto the vehicle and then a hitch locus estimated line can be obtained with higher precision by utilizing a sensed value.

At this time, the display locus outputting means 102 calculates the hitch locus estimated line on the screen in real time by calculating a hitch locus in the real space based on Ackermann Model as the behavior model of the vehicle, for example, or the like and then perspective-transforming the hitch locus by using the camera parameters. Otherwise, the calculation process of the hitch locus estimated line is not executed one by one, but a correlation table between the hitch height and the steering angle and the estimated locus on the screen is previously prepared. Then, the concerned estimated locus line can be selected from several or several tens estimated locus line, which are registered previously in the memory, etc., based on this correlation table to output.

The locus superposing means 103 receives the data of the hitch locus estimated line output from the displayed locus outputting means 102, and then superposes the hitch locus estimated line on the video obtained by the image picking-up means 101 (the camera 2 in FIG. 1). Then, the displaying means 104 displays the picked-up image of the rear-view camera, on which line drawing data of the hitch locus estimated line is superposed to display, on the screen to provide such image to the driver.

Figure 3:
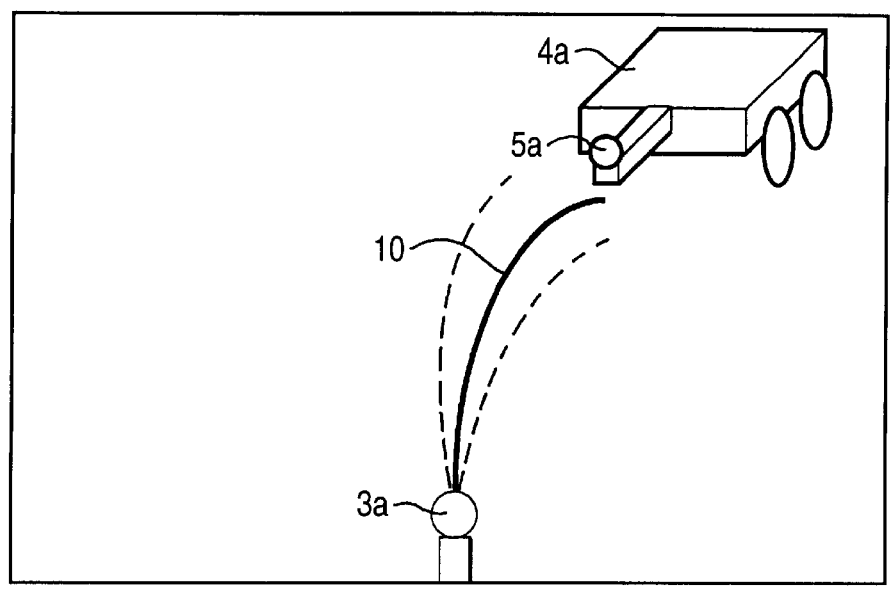
FIG. 3. is a view showing an example of a screen display in the driving aiding system shown in FIG. 2.

FIG. 3 is a view showing an example of the screen display in the driving aiding system shown in FIG. 2. In the screen in FIG. 3, a hitch image 3a on the own vehicle side and a coupler image 5a of a destination vehicle image 4a are picked up by the camera 2, and are displayed in one screen. In the present embodiment, a hitch locus estimated line 10 extended from this hitch image 3a is displayed by superposing. This hitch locus estimated line 10 can be swung rightward and leftward, as shown by a dotted line in FIG. 3, by changing the steering angle. Therefore, if the vehicle is backed while adjusting the steering angle such that a top end of the hitch locus estimated line 10 coincides with the coupler image 5a, it is possible to mate positions of the hitch 3 and the coupler 5 with each other.

Figure 4:
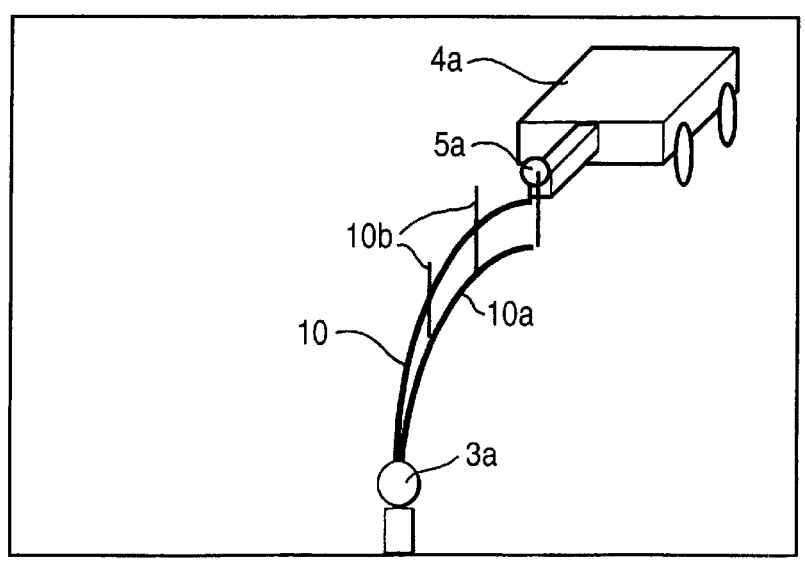
FIG. 4 is a view showing another example of the screen display in the driving aiding system shown in FIG. 2.

FIG. 4 is a view showing another example of the screen display in the driving aiding system shown in FIG. 2. In the example of the screen display shown in FIG. 3, only the hitch locus estimated line 10 is superposed on the picked-up image of the camera to display. In the example of the screen in FIG. 4, in order to make viewing further easier, in addition to the hitch locus estimated line 10, a locus line 10a that is obtained by vertically projecting the hitch locus estimated line onto a road surface in the real space is also displayed by superposing. Further, in addition to the hitch locus estimated line 10 and the on-road projected locus line 10a that is obtained by projecting this hitch locus estimated line 10 onto the road surface, lines 10b that are provided by connecting points on the hitch locus estimated line 10 and points on the road surface, which are obtained when these points are vertically projected onto the road surface, at a proper interval to reach a height of the coupler 5 is also superposed to display.

In this manner, the hitch locus estimated line 10, the on-road projected locus line 10a, and the vertical lines 10b for correlating both lines 10 and 10a with each other are displayed on the screen, and also the vertical lines 10b are extended up to the height of the coupler 5. Therefore, the relative positional relationships among the road surfaces, the hitch, and the coupler, all have a different height respectively, can be precisely grasped and also the positional alignment can be attained by guiding the hitch to the coupler easily and precisely.

Figure 5:
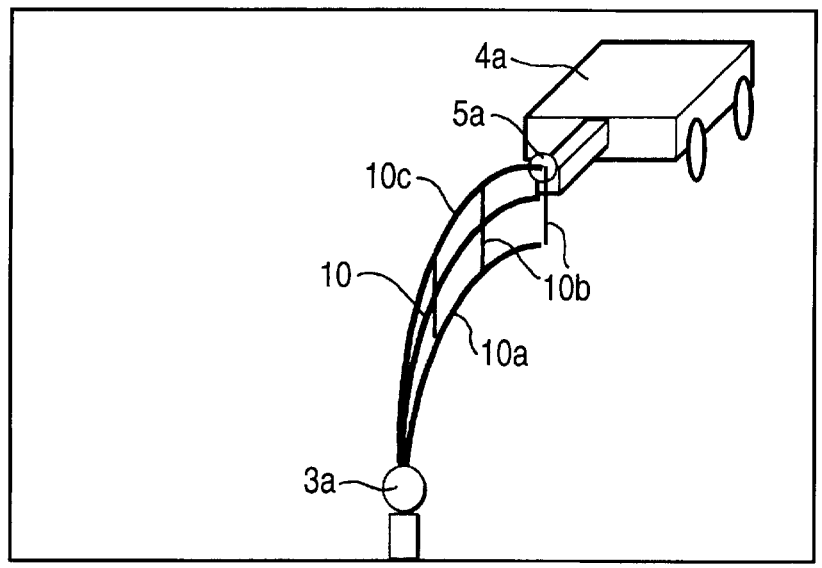
FIG. 5 is a view showing still another example of the screen display in the driving aiding system shown in FIG. 2.

FIG. 5 is still another displayed example of the screen in the driving aiding system according to the present embodiment. The displayed example of the screen in FIG. 5 is different from the displayed example of the screen in FIG. 4 in that a curved line 10c that connects respective top ends of plural vertical lines 10b is added. The image in which the top ends of the vertical lines 10b are connected by the curved line 10c is easier to see than the mere display of the vertical lines 10b, as shown in FIG. 4.

In this case, out of the hitch locus estimated line 10, the on-road projected locus line 10a, the vertical lines 10b, and the curved line 10c shown in FIG. 5, the mostly needed line is the hitch locus estimated line 10. Therefore, it is preferable that the hitch locus estimated line 10 should be easily discriminated from other lines 10a, 10b, 10c by displaying it by a different color or by flashing the display of the hitch locus estimated line 10 only.

In the above embodiment, the backing drive of the vehicle is aided by displaying the hitch locus estimated line variably in response to the steering angle. But there are some vehicles onto which the steering angle sensor is not equipped. In such vehicles, the hitch locus estimated line that is changed in response to the steering angle cannot be displayed on the picked-up image of the cameraby superposing. Therefore, as a second embodiment of the present invention, a driving aiding system that is suitable to equip onto the vehicle without the steering angle sensor will be explained hereunder.

A configuration of the driving aiding system according to the second embodiment is identical to that of the driving aiding system according to the first embodiment in FIG. 2. In the present embodiment, the point that the sensed signal of the steering angle sensor is not input into the display locus outputting means 102 is different. An example of the screen display in the driving aiding system according to the second embodiment is shown in FIG. 6.

Figure 6:
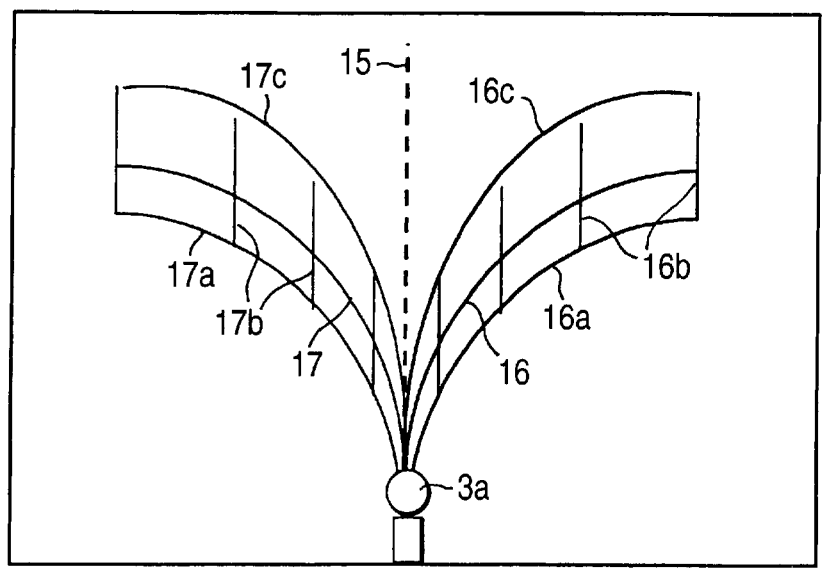
FIG. 6 is a view showing an example of a screen display in a driving aiding system according to another embodiment of the present invention.

In the example of the screen display in FIG. 6, the illustration of the coupled destination vehicle is omitted. The hitch image 3a of own vehicle is displayed in the screen. Since the hitch is fixed to the vehicle, data of a hitch locus estimated line 15 that is extended from this hitch image 3a at the steering angle of 0 degree, i.e., when the vehicle is backed straightly is stored previously in the memory, etc. and then this data is superposed to display.

In addition, since the maximum steering angle of the steering angle has a previously decided value according to the type of the vehicle, data of a hitch locus estimated line 16 at the right maximum steering angle and data of a hitch locus estimated line 17 at the left maximum steering angle can also be prepared previously in the memory, etc. Then, in the embodiment shown in FIG. 6, like FIG. 5, on-road projected locus lines 16a, 17a, vertical lines 16b, 17b, and the curved lines 16c, 17c are displayed respectively together with the hitch locus estimated lines 16, 17 to grasp precisely the relative positional relationships among the road surface, the hitch, and the coupler, all have a different height respectively.

While looking at the picked-up image of the camera on which such hitch locus estimated lines 15, 16, 17, etc. are displayed by superposing, the driver backs straightly the vehicle at the steering angle of 0 degree. At this time, it is preferable that the vehicle should be backed such that the destination coupler image coincides with the hitch locus estimated line 15 at the steering angle of 0 degree. If only the hitch locus estimated line 15 at the steering angle of 0 degree is superposed to display on the picked-up screen of the rear-view camera, the trial and error to move the vehicle forward and backward must be repeated to mate the destination coupler image with the hitch locus estimated line 15. However, in the present embodiment, since the hitch locus estimated lines 16, 17 at the maximum steering angles are displayed on the screen, such trial and error is not needed.

In other words, when the vehicle is backed straightly at the steering angle of 0 degree, the image of the trailed vehicle as the coupled destination enters into the screen and the coupler image on the trailed vehicle side proceeds in parallel with the hitch locus estimated line 15 at the steering angle of 0 degree. At this time, if the coupler image coincides exactly with the hitch locus estimated line 15, the vehicle may be backed as it is. If the coupler image is deviated from the hitch locus estimated line 15, the vehicle is backed until the coupler image overlaps with the hitch locus estimated line 16 or 17 at the maximum steering angle. Then, at a point of time when the coupler image overlaps with the hitch locus estimated line 16 or 17 at the maximum steering angle, the driver turns fully the steering toward the (right or left) coincident side up to the maximum steering angle and backs the vehicle slowly.

Accordingly, the coupler image comes close to the hitch image 3*a* along the hitch locus estimated line 16 or 17 at the maximum steering angle. If the vehicle is stopped at a point of time when both images coincide with each other, it is possible to mate the hitch with the destination coupler.

Figure 7:
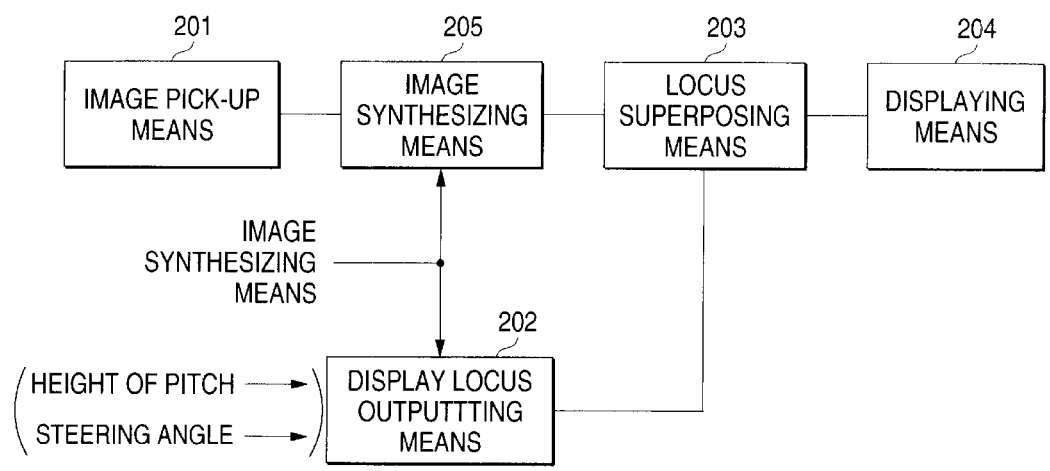
FIG. 7 is a view showing a configuration of a driving aiding system according to still another embodiment of the present invention.

FIG. 7 is a view showing a configuration of a driving aiding system according to a third embodiment of the present invention. Like the first embodiment, the driving aiding system according to the third embodiment comprises an image picking-up means 201, a display locus outputting means 202, a locus superposing means 203, and a displaying means 204. Since these functions are similar to those in the first embodiment, their explanation will be omitted hereunder.

In this third embodiment, in addition to the above configuration, an image synthesizing means 205 is provided between the image picking-up means 201 and the locus superposing means 203, and the image synthesizing means 205 and the displayed locus outputting means 202 are controlled in response to the difference of the image synthesizing method.

The image synthesis signifies to work the picked-up image of the rear-view camera in response to the purpose variously. For example, in FIG. 1, the coordinates of the picked-up image of the rear-view camera 2 are transformed into the image that is viewed downward from the imaginary viewpoint A to display. Otherwise, only the coordinates of the portion of the hitch 3 are transformed into the image that is viewed from the imaginary viewpoint A, and the image of the trailed vehicle 4 in the picked-up image of the camera 2 is used as it is, and then these images are synthesized to display. Otherwise, the partial area is cut out from the picked-up image of the camera 2 to form the enlarged image, or the picked-up image of the camera 2 has the lens distortion since such image is a panoramic image picked up by the wide-angle camera, and thus the distortion of the image is corrected.

The image synthesis (image processing) can be executed by the operation by a processor. However, in order to provide the screen display in real time, it is preferable that the objective synthesized image (processed image) should be obtained by preparing previously the mapping table for the image synthesis and relocating respective pixels of the picked-up image of the camera 2 while looking up the mapping table.

In the first and second embodiments, because the picked-up image of the camera is displayed on the screen of the displaying means as it is, the hitch locus estimated lines corresponding to this image are displayed by superposing on the screen. In this case, if the synthesized image is displayed on the screen, the hitch locus estimated lines corresponding to this synthesized image must be displayed by superposing on the screen. For that purpose, as shown in FIG. 7, the image synthesizing means 205 selects the mapping table according to the image synthesizing method, and then the displayed locus outputting means 202 outputs the data of the hitch locus estimated lines according to the image synthesizing method.

Figure 8:
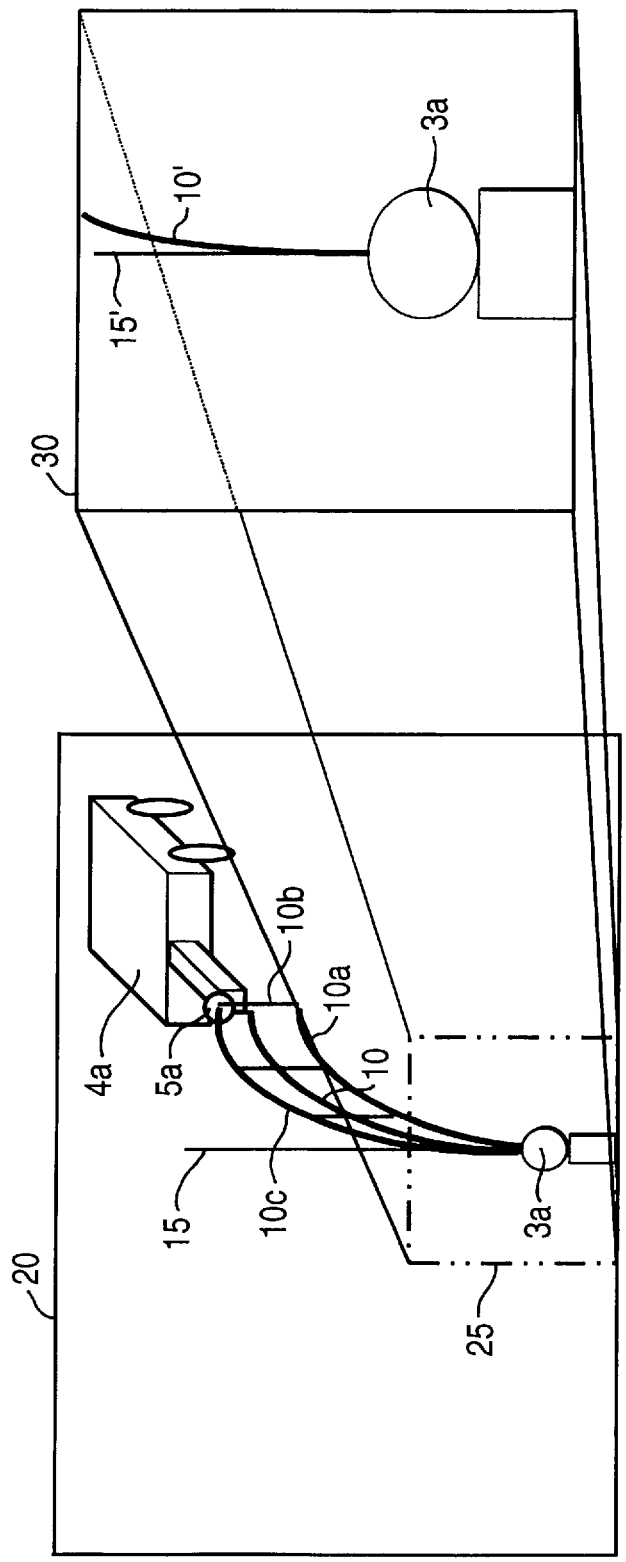
FIG. 8 is a view showing an example of a screen display in the driving aiding system shown in FIG. 7.

FIG. 8 is a view showing an example of the screen display in the driving aiding system according to the third embodiment. In this embodiment, like the first embodiment, first the hitch locus estimated line 10, the road-surface projected locus line 10*a*, etc. are superposed on a picked-up image 20 of the wide-angle camera to display and to provide to the driver. Then, when the ultrasonic sensor 6 in FIG. 1, or the like senses that the trailed vehicle comes closely within a predetermined distance, an area 25 of the panoramic image (screen 20) in the neighborhood of the hitch image in FIG. 8 is cut out, and the hitch is coordinate-transformed into the image viewed from the right upper side, and then an enlarged screen 30 on the right side in FIG. 8 is displayed.

In this case, the screen 20 and the screen 30 maybe switched to display, or the screen of the displaying means 204 is divided into two screens to display the screen 20 and the screen 30 in parallel. It is preferable to display clearly a range indicating the above area 25 on the screen 20 since the relative relationship between the screen 20 and the screen 30 can be understood. If both screens 20, 30 are displayed in parallel, positions of the hitch in both screens 20, 30 are set at the same level. More particularly, in the case that both screens 20, 30 are displayed laterally in parallel, it is preferable that the hitch positions in the vertical direction in respective screens are displayed to coincide with each other since the relative relationship between them can be understood.

The screen 20 is the picked-up image of the camera, while the screen 30 is the imaginary viewpoint transformed image. Therefore, if the hitch locus estimated line displayed on the screen 20 is merely enlarged, the improper locus is obtained. For this reason, the hitch locus estimated line 15' at the steering angle of 0 degree and the hitch locus estimated line 10 in response to the steering angle are superposed on the enlarged screen by using the data that are fitted for the imaginary viewpoint transformed image to display. As a result, the driver can carry out the higher precision driving operation when the hitch and the destination coupler come close to each other.

The main purpose of the rear-view camera is to check the safety when the vehicle is to be backed. Since the hitch locus estimated lines that are superposed on the screen to display are of no use when only the safety check should be carried out, the hitch locus estimated lines maybe superposed to display only when the hitch coupling operation is to be carried out or only when the hitch locus displaying instruction is input from the driver, or the like.

According to the present invention, the backing drive of the vehicle in the hitch coupling operation can be aided satisfactorily, so that the operation for causing the hitch and the destination coupler to coincide with each other with high precision can be facilitated.

What is claimed is:

1. A driving aiding system for displaying a picked-up image of a rear-view camera equipped onto a rear portion of a vehicle on a screen of a displaying means arranged at a position, that can be viewed from a driver's seat, when the vehicle is to be backed, comprising:

a locus superposing means for superposing a locus estimated line of a hitch which is equipped onto a rear portion of the vehicle on the picked-up image of the rear-view camera to display when a predetermined instruction input is received.

2. A driving aiding system according to claim 1, wherein the locus superposing means has a means for superposing a line, which is obtained by projecting the locus estimated line onto a road surface, simultaneously on the screen to display when the locus estimated line of the hitch is superposed on the screen to display.

3. A driving aiding system according to claim 2, wherein the locus superposing means has a means for superposing vertical lines indicating a height of a coupler as a coupling destination of the hitch at a proper interval onto the locus estimated line and a road-surface projected locus estimated line to display.

4. A driving aiding system according to claim 2, wherein the locus superposing means has a means for superposing a curved line indicating a height of a coupler as a coupling destination of the hitch along the locus estimated line on the screen to display.

5. A driving aiding system according to claim 1, wherein the locus superposing means has a means for changing the locus estimated line in response to change in a steering angle of the vehicle.

6. A driving aiding system according to claim 1, wherein the locus superposing means has a means for changing the locus estimated line in response to change in a height.

7. A driving aiding system for displaying a processed image obtained by processing a picked-up image of a rear-view camera equipped onto a rear portion of a vehicle on a screen of a displaying means arranged at a position, which can be viewed from a driver's seat, when the vehicle is to be backed, comprising:

a locus superposing means for superposing a processed locus estimated line of a hitch, that is equipped onto a rear portion of the vehicle, on the processed image to display when a predetermined instruction input is received.

8. A driving aiding system according to claim 7, wherein the locus superposing means has a means for superposing a line, which is obtained by projecting the locus estimated line onto a road surface, simultaneously on the screen to display when the locus estimated line of the hitch is superposed on the screen to display.

9. A driving aiding system according to claim 8, wherein the locus superposing means has a means for superposing vertical lines indicating a height of a coupler as a coupling destination of the hitch at a proper interval onto the locus estimated line and a road-surface projected locus estimated line to display.

10. A driving aiding system according to claim 8, wherein the locus superposing means has a means for superposing a curved line indicating a height of a coupler as a coupling destination of the hitch along the locus estimated line on the screen to display.

11. A driving aiding system according to claim 7, wherein the locus superposing means has a means for changing the locus estimated line in response to change in a steering angle of the vehicle.

12. A driving aiding system according to claim 7, wherein the locus superposing means has a means for changing the locus estimated line in response to change in a height.

13. A driving aiding system for displaying a picked-up image of a rear-view camera equipped onto a rear portion of a vehicle on a screen of a displaying means arranged at a position, that can be viewed from a driver's seat, when the vehicle is to be backed, comprising:

a locus superposing means for superposing a locus estimated line of a hitch, that is equipped onto a rear portion of the vehicle, at a maximum steering angle on the picked-up image of the rear-view camera to display.

14. A driving aiding system according to claim 13, wherein the image processing means has a means for superposing the locus estimated line of the hitch at a steering angle of 0 degree on the screen to display.

15. A driving aiding system for displaying a processed image obtained by processing a picked-up image of a rear-view camera equipped onto a rear portion of a vehicle on a screen of a displaying means arranged at a position, that can be viewed from a driver's seat, when the vehicle is to be backed, comprising:

a locus superposing means for superposing a processed locus estimated line of a hitch, that is equipped onto a rear portion of the vehicle, at a maximum steering angle on the processed image to display when a predetermined instruction input is received.

16. A driving aiding system according to claim 15, wherein the image processing means has a means for superposing the locus estimated line of the hitch at a steering angle of 0 degree on the screen to display.

* * * * *